(12) United States Patent
Griffin et al.

(10) Patent No.: US 12,056,523 B2
(45) Date of Patent: *Aug. 6, 2024

(54) RULE-DRIVEN SERVICE MANAGEMENT USING ENTANGLED QUBITS IN QUANTUM COMPUTING SYSTEMS

(71) Applicant: Red Hat, Inc., Raleigh, NC (US)

(72) Inventors: Leigh Griffin, Waterford City (IE); Stephen Coady, Waterford City (IE)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/841,420

(22) Filed: Jun. 15, 2022

(65) Prior Publication Data

US 2022/0308923 A1 Sep. 29, 2022

Related U.S. Application Data

(63) Continuation of application No. 16/527,790, filed on Jul. 31, 2019, now Pat. No. 11,372,676.

(51) Int. Cl.
*G06F 9/48* (2006.01)
*G06F 1/06* (2006.01)
*G06N 10/00* (2022.01)

(52) U.S. Cl.
CPC ............. *G06F 9/4881* (2013.01); *G06F 1/06* (2013.01); *G06N 10/00* (2019.01)

(58) Field of Classification Search
None
See application file for complete search history.

(56) References Cited

U.S. PATENT DOCUMENTS

| 7,781,754 | B2 * | 8/2010 | Loss ..................... B82Y 10/00 257/E21.089 |
| 9,680,452 | B1 * | 6/2017 | Abdo .................... G02F 1/3534 |
| 10,056,983 | B2 | 8/2018 | Brandenburger et al. |
| 10,171,238 | B2 | 1/2019 | Howe et al. |
| 10,255,555 | B2 | 4/2019 | Curtis et al. |
| 10,483,980 | B2 * | 11/2019 | Sete ..................... H03K 19/195 |
| 10,872,021 | B1 * | 12/2020 | Tezak .................... G06N 10/00 |
| 11,354,460 | B2 * | 6/2022 | Zuccarelli ............. G06N 10/00 |

(Continued)

FOREIGN PATENT DOCUMENTS

| EP | 3340494 A1 | 6/2018 |
| KR | 101924100 B1 | 2/2019 |
| WO | 2019055847 A1 | 3/2019 |

OTHER PUBLICATIONS

Author Unknown, "What does it mean for two qubits to be entangled," Quantum Computing Stack Exchange, quantumcomputing.stackexchange.com/questions/1631/what-does-it-mean-for-two-qubits-to-be-entangled, last updated Apr. 8, 2018, 14 pages.

(Continued)

*Primary Examiner* — Van H Nguyen
(74) *Attorney, Agent, or Firm* — Dority & Manning, P.A.

(57) ABSTRACT

A first quantum computing device detects an occurrence of a trigger condition. The first quantum computing device identifies a quantum operation corresponding to the trigger condition and performs the quantum operation on a first qubit maintained by the first quantum computing device, the first qubit being in an entangled state with a corresponding second qubit maintained by a second quantum computing device.

20 Claims, 8 Drawing Sheets

(56) References Cited

U.S. PATENT DOCUMENTS

| | | | |
|---|---|---|---|
| 11,372,676 B2* | 6/2022 | Griffin | G06N 5/04 |
| 2018/0107092 A1* | 4/2018 | Abdo | G06N 10/00 |
| 2018/0262276 A1 | 9/2018 | Bishop et al. | |
| 2018/0274900 A1 | 9/2018 | Mower et al. | |
| 2018/0276014 A1 | 9/2018 | Kliuchnikov et al. | |
| 2018/0322409 A1 | 11/2018 | Barends | |
| 2019/0007051 A1* | 1/2019 | Sete | G06N 10/00 |
| 2019/0042264 A1* | 2/2019 | Zou | G06F 9/30196 |
| 2019/0042970 A1* | 2/2019 | Zou | G06F 9/30101 |
| 2019/0042973 A1 | 2/2019 | Zou et al. | |
| 2020/0007576 A1 | 1/2020 | Buhacoff | |
| 2021/0390439 A1 | 12/2021 | Ramasamy | |

OTHER PUBLICATIONS

Bursell, Mike, "Quantum computing and security: 5 looming questions," The Enterprisers Project, Jan. 29, 2019, Red Hat, Inc., 7 pages.

Author Unknown, "projectq Documentation," Release 0.4.2, Jan. 31, 2019, 90 pages.

Mathew, Reuble, et al., "Quantum control for conditional rotation of excitation qubits in semiconductor dots," Physical Review B, vol. 84, Nov. 2011, American Physical Society, 11 pages.

Chuang, Isaac L., "Quantum Algorithm for Distributed Clock Synchronization," Physical Review Letters, vol. 85, No. 9, Aug. 28, 2000, American Physical Society, 4 pages.

Keyes, Robert W., "After the Transistor, the Qubit?", Computing in Science & Engineering, IEEE CS and the American Institute of Physics, Jan. 2005, 6 pages.

Vandersypen, Lieven, "Quantum Computing—The Next Challenge in Circuit and System Design," 2017 IEEE International Solid-State Circuits Conference, Feb. 6, 2017, 6 pages.

Non-Final Office Action for U.S. Appl. No. 16/431,363, mailed Apr. 27, 2022, 16 pages.

Notice of Allowance for U.S. Appl. No. 16/527,790, mailed Feb. 24, 2022, 24 pages.

Non-Final Office Action for U.S. Appl. No. 16/431,363, mailed May 27, 2022, 12 pages.

Final Office Action for U.S. Appl. No. 16/431,363, mailed Feb. 16, 2023, 16 pages.

Advisory Action for U.S. Appl. No. 16/431,363, mailed Apr. 28, 2023, 5 pages.

* cited by examiner

RULE-DRIVEN SERVICE MANAGEMENT USING ENTANGLED QUBITS IN QUANTUM COMPUTING SYSTEMS

RELATED CASE

This is a continuation of U.S. Pat. No. 11,372,676, filed on Jul. 31, 2019, entitled "RULE-DRIVEN SERVICE MANAGEMENT USING ENTANGLED QUBITS IN QUANTUM COMPUTING SYSTEMS," the disclosure of which is hereby incorporated herein by reference in its entirety.

BACKGROUND

Quantum computing involves the use of quantum bits, referred to herein as "qubits," which have characteristics that differ from those of classical (i.e., non-quantum) bits used in classical computing. For example, while a classical bit may be in a state of either one (1) or zero (0), a qubit may be in a "superposition" of both states simultaneously. A pair of qubits may also experience a physical phenomenon referred to as "entanglement," in which the quantum state of each qubit cannot be described independently of the state of the other qubit.

SUMMARY

The examples disclosed herein relate to rules-driven service management using entangled qubits in quantum computing systems. In one example, a first quantum computing device maintains a first qubit that is in an entangled state with a corresponding second qubit that is maintained by a second quantum computing device. Upon the first quantum computing device detecting an occurrence of a trigger condition (e.g., a central processing unit (CPU) threshold detection, a memory limitation occurrence, or a security key cycle request, as non-limiting examples), the first quantum computing device identifies a quantum operation corresponding to the trigger condition. The first quantum computing device then performs the quantum operation corresponding to the trigger condition on the first qubit. Concurrently with the first quantum computing device performing the quantum operation, the second quantum computing device observes a quantum state (e.g., a Bell state, a spin, a rotation angle, a degree, and/or a plane, as non-limiting examples) of the second qubit resulting from the quantum operation performed on the first qubit. The second quantum computing device identifies a responsive action that corresponds to the quantum state of the second qubit, and then performs the responsive action. In some examples, the first quantum computing device and the second quantum computing device may include a first quantum clock and a second quantum clock, respectively. The first and second quantum clocks may be synchronized, and used to concurrently perform the quantum operation on the first qubit and observe the quantum state of the second qubit. In this manner, the entangled state between the first qubit and the second qubit may be employed to provide rules-driven service management, wherein rules are represented by trigger conditions and corresponding quantum operations in the first quantum computing device, and by observed quantum states and corresponding responsive actions in the second quantum computing device.

In another example, a method is provided. The method comprises detecting, by a first quantum computing device, an occurrence of a trigger condition. The method further comprises identifying, by the first quantum computing device, a quantum operation corresponding to the trigger condition. The method also comprises performing, by the first quantum computing device, the quantum operation on a first qubit maintained by the first quantum computing device, wherein the first qubit is in an entangled state with a corresponding second qubit maintained by a second quantum computing device. The method additionally comprises concurrently with the performing the quantum operation on the first qubit and observing, by the second quantum computing device, a quantum state of the second qubit resulting from the quantum operation on the first qubit. The method further comprises identifying, by the second quantum computing device, a responsive action corresponding to the quantum state of the second qubit. The method also comprises performing, by the second quantum computing device, the responsive action.

In another example, a computing system is provided. The computing system comprises a first quantum computing device that includes a first system memory, and a first quantum processor device coupled to the first system memory. The computing system also comprises a second quantum computing device that includes a second system memory, and a second quantum processor device coupled to the second system memory. The first quantum processor device is to detect an occurrence of a trigger condition, and identify a quantum operation corresponding to the trigger condition. The first quantum processor device is further to perform the quantum operation on a first qubit maintained by the first quantum computing device, wherein the first qubit is in an entangled state with a corresponding second qubit maintained by a second quantum computing device. The second quantum processor device is to, concurrently with the performing the quantum operation on the first qubit, observe a quantum state of the second qubit resulting from the quantum operation on the first qubit. The second quantum processor device is further to identify a responsive action corresponding to the quantum state of the second qubit, and perform the responsive action.

In another example, a computer program product is provided. The computer program product is stored on a non-transitory computer-readable storage medium, and includes instructions to cause a quantum processor device to detect an occurrence of a trigger condition, and identify a quantum operation corresponding to the trigger condition. The instructions further cause a quantum processor device to perform the quantum operation on a first qubit that is in an entangled state with a corresponding second qubit. The instructions also cause a quantum processor device to, concurrently with the performing the quantum operation on the first qubit, observe a quantum state of the second qubit resulting from the quantum operation on the first qubit. The instructions additionally cause a quantum processor device to identify a responsive action corresponding to the quantum state of the second qubit, and perform the responsive action.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

As discussed above, quantum computing involves the use of quantum bits, referred to herein as "qubits." A qubit encodes quantum information for an underlying particle such as an atom or a photon, and possesses characteristics that differ from those of classical (i.e., non-quantum) bits used in classical computing. For example, while a classical bit may be in a state of either one (1) or zero (0), a qubit may be in a "superposition" of both states simultaneously. A pair of qubits may also experience a physical phenomenon referred to as "entanglement," in which the quantum state of each qubit cannot be described independently of the state of the other qubit. Classical computing has no corollaries to superposition and entanglement.

Using the phenomenon of entanglement, multiple qubits may be linked together in such a manner that performing a quantum action on a first qubit (e.g., measuring the quantum state of the first qubit) determines the possible quantum states of a second qubit that is in an entangled state with the first qubit. Accordingly, it is desirable to use quantum entanglement to provide mechanisms for providing rules-driven service management across multiple quantum computing systems.

In this regard, the examples disclosed herein relate to rules-driven service management using entangled qubits in quantum computing systems. In one example, a first quantum computing device maintains a first qubit that is in an entangled state with a corresponding second qubit that is maintained by a second quantum computing device. When the first quantum computing device detects an occurrence of a trigger condition, the first quantum computing device identifies a quantum operation corresponding to the trigger condition, then performs the quantum operation corresponding to the trigger condition on the first qubit. Concurrently with the first quantum computing device performing the quantum operation, the second quantum computing device observes a quantum state of the second qubit resulting from the quantum operation performed on the first qubit. The second quantum computing device identifies a responsive action that corresponds to the quantum state of the second qubit, and then performs the responsive action. In this manner, the entangled state between the first qubit and the second qubit may be employed to provide rules-driven service management, wherein rules are represented by trigger conditions and corresponding quantum operations in the first quantum computing device, and by observed quantum states and corresponding responsive actions in the second quantum computing device.

Figure 1:
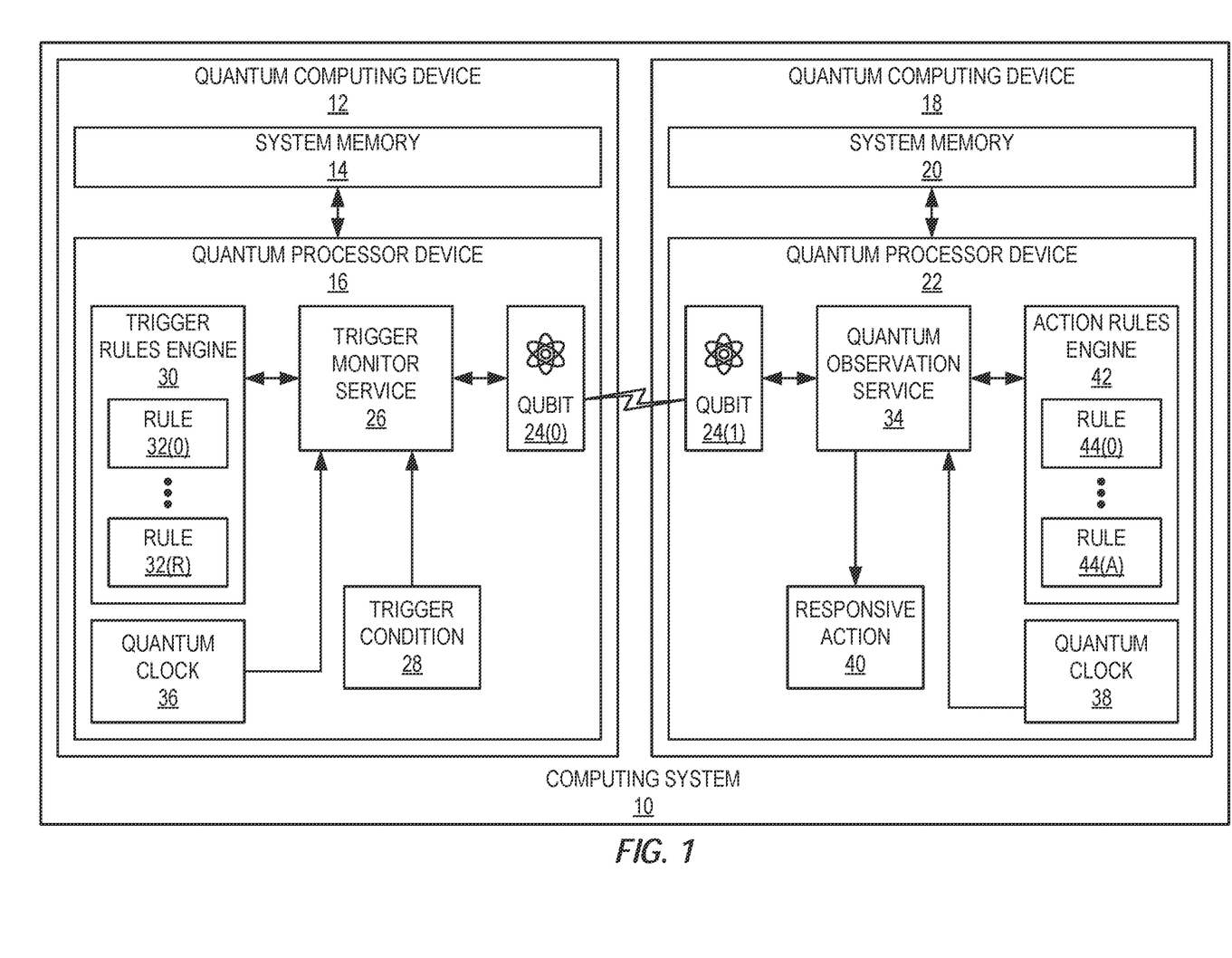
FIG. 1 is a block diagram of a computing system in which examples may be practiced.

FIG. 1 is a block diagram of a computing system 10 in which examples may be practiced. The computing system 10 includes a quantum computing device 12 (i.e., the "first quantum computing device 12") that comprises a first system memory 14 and a first quantum processor device 16, and also includes a quantum computing device 18 (i.e., the "second quantum computing device 18") that comprises a second system memory 20 and a second quantum processor device 22. It is to be understood that the computing system 10 according to some examples may include other classical computing devices and/or additional quantum computing devices that are not illustrated in FIG. 1. Additionally, the first quantum computing device 12 and the second quantum computing device 18 in some examples may include constituent elements in addition to those illustrated in FIG. 1.

The first quantum processor device 16 of the first quantum computing device 12 maintains a qubit 24(0) (i.e., the "first qubit 24(0)") that is in an entangled state with a qubit 24(1) (i.e., the "second qubit 24(1)") maintained by the second quantum processor device 22 of the second quantum computing device 18. According to some examples, prior to the computing system 10 performing the operations described in greater detail below, an entangled state is induced between the first qubit 24(0) and the second qubit 24(1), with the first qubit 24(0) subsequently being sent to the first quantum computing device 12 and the second qubit 24(1) being sent to the second quantum computing device 18. Inducing the entangled state between the first qubit 24(0) and the second qubit 24(1) may be performed, e.g., by a quantum computing device using Quantum Assembly (QASM) files to apply a Hadamard gate to the first qubit 24(0) to place it a state of superposition, and then apply a CNOT gate to the second qubit 24(1), as a non-limiting example. Qubits such as the first qubit 24(0) and the second qubit 24(1) may be transferred among the first quantum computing device 12 and the second quantum computing device 18 in the form of photons transmitted via fiber optic cabling or through free space using pulsed lasers, as non-limiting examples.

As seen in FIG. 1, the first qubit 24(0) maintained by the first quantum computing device 12 is associated with a trigger monitor service 26. The trigger monitor service 26 monitors the internal state of the first quantum computing device 12 and/or conditions external to the first quantum computing device 12 to detect an occurrence of a trigger condition 28. The trigger condition 28 may comprise one of predefined sets of one or more conditions or thresholds, and, in some examples, may comprise a central processing unit (CPU) threshold detection, a memory limitation occurrence, and/or a security key cycle request, as non-limiting examples.

Upon detecting the trigger condition 28, the trigger monitor service 26 identifies a quantum operation (e.g., measurements or other actions that may be performed on the first qubit 24(0) that will result in a given quantum state of the first qubit 24(0)) that corresponds to the trigger condition 28. In some examples, the trigger monitor service 26 may identify the quantum operation corresponding to the trigger condition 28 using a trigger rules engine 30 of the first quantum computing device 12. As discussed below in greater detail with respect to FIG. 2, the trigger rules engine 30 in such examples provides a plurality of rules 32(0)-32(R), each of which represents a unique combination of a trigger condition and an associated quantum operation. In this manner, the trigger monitor service 26 may employ the trigger rules engine 30 both to confirm that the trigger condition 28 is a valid trigger condition, as well as to identify the quantum operation to perform on the first qubit 24(0) in response to detecting the trigger condition 28.

After identifying the quantum operation corresponding to the trigger condition 28, the first quantum computing device 12 performs the quantum operation on the first qubit 24(0). Because the first qubit 24(0) is in an entangled state with the second qubit 24(0) maintained by the second quantum computing device 18, the quantum operation performed on the first qubit 24(0) by the first quantum computing device 12 results in a corresponding change in the quantum state of the second qubit 24(1). To identify the change in quantum state of the second qubit 24(1) as a result of the quantum operation performed on the first qubit 24(0), the second quantum computing device 18 in the example of FIG. 1 includes a quantum observation service 34 for performing observations of the second qubit 24(1). The quantum observation service 34 of the second quantum computing device 18 observes the quantum state of the second qubit 24(1) concurrently with the trigger monitor service 26 of the first quantum computing device 12 performing the quantum operation on the first qubit 24(0). The quantum state observed by the quantum observation service 34 may include, as non-limiting examples, a Bell state, a spin, a rotation angle, a degree, and a plane of the second qubit 24(1).

In some examples, the first quantum computing device 12 and the second quantum computing device 18 may include a quantum clock 36 (i.e., the "first quantum clock 36") and a quantum clock 38 (i.e., the "second quantum clock 38"), respectively. The first quantum clock 36 and the second quantum clock 38 may be synchronized prior to the operations described herein, and may be used by the first quantum computing device 12 and the second quantum computing device 18 to ensure that the operations for performing the quantum operation on the first qubit 24(0) and observing the quantum state of the second qubit 24(1) take place concurrently. For instance, the first quantum computing device 12 may perform the quantum operation on the first qubit 24(0) in response to the first quantum clock 36 reaching an execution time, and the second quantum computing device 18 may observe the quantum state of the second qubit 24(1) in response to the second quantum clock 38 reaching the same execution time.

Based on the observed quantum state of the second qubit 24(1), the quantum observation service 34 of the second quantum computing device 18 identifies a responsive action 40 to perform. According to some examples, the quantum observation service 34 may identify the responsive action 40 corresponding to the observed quantum state using an action rules engine 42 of the second quantum computing device 18. As discussed below in greater detail with respect to FIG. 3, the action rules engine 42 in such examples provides a plurality of rules 44(0)-44(A), each of which represents a unique combination of a quantum state and an associated responsive action. Thus, the action rules engine 42 may be used by the quantum observation service 34 to identify a responsive action, such as the responsive action 40, to perform in response to the observed quantum state of the second qubit 24(1).

Figure 2:
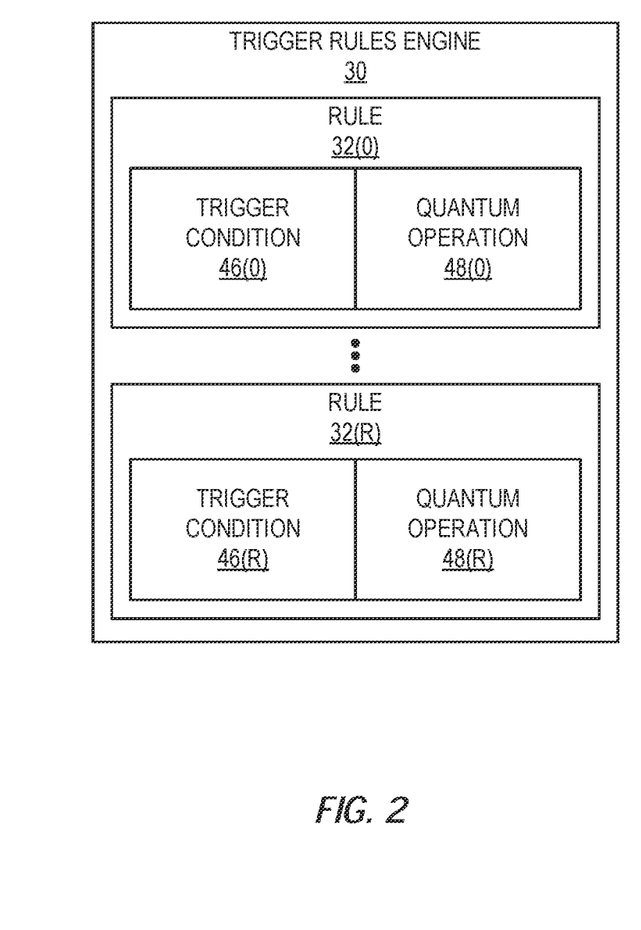
FIG. 2 is a block diagram illustrating contents of a rule of the trigger rules engine of FIG. 1, according to one example.

FIG. 2 is a block diagram illustrating contents of the rules 32(0)-32(R) of the trigger rules engine 30 of FIG. 1 in greater detail, according to one example. As seen in FIG. 2, the rules 32(0)-32(R) each includes a corresponding trigger condition 46(0)-46(R) that is associated with a corresponding quantum operation 48(0)-48(R). In some examples, the trigger conditions 46(0)-46(R) specified by the rules 32(0)-32(R) may represent the only valid trigger conditions recognized by the trigger monitor service 26 of FIG. 1, and thus may be used by the trigger monitor service 26 to determine whether a detected trigger condition is a valid trigger condition. Each of the quantum operations 48(0)-48(R) may specify one or more measurements or other actions that may be applied to the first qubit 24(0) of FIG. 1 to place the first qubit 24(0) into a desired quantum state (and, due to entanglement, to also place the second qubit 24(1) into a corresponding quantum state detectable by the quantum observation service 34 of the second quantum computing device 18).

Figure 3:
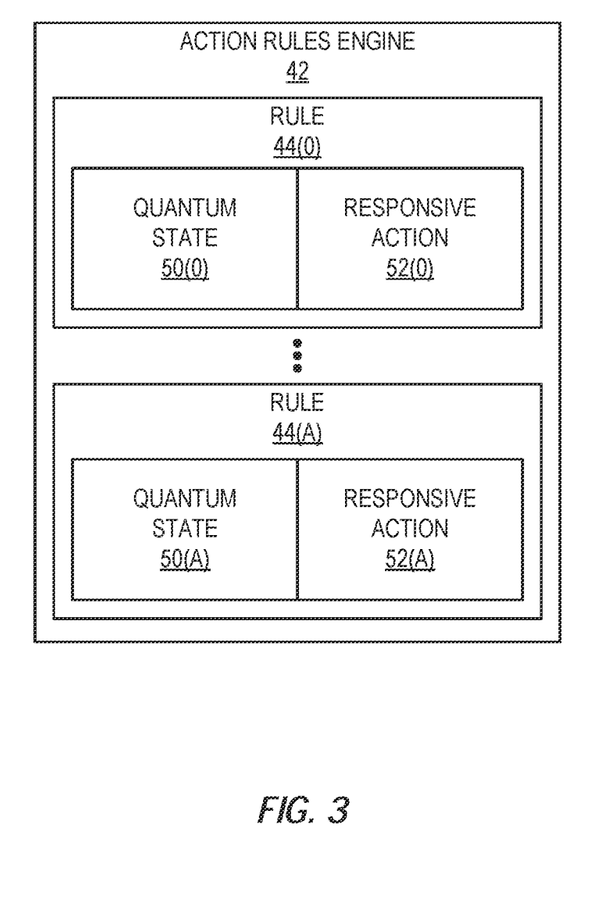
FIG. 3 is a block diagram illustrating contents of a rule of the action rules engine of FIG. 1, according to one example.

Similarly, FIG. 3 illustrates contents of the rules 44(0)-44(A) of the action rules engine 42 of FIG. 1 in greater detail, according to one example. In the example of FIG. 3, the rules 44(0)-44(R) each includes a corresponding quantum state 50(0)-50(A) that is associated with a corresponding responsive action 52(0)-52(A). The quantum states 50(0)-50(A) each may specify a combination of a Bell state, a spin, a rotation angle, a degree, and/or a plane of the second qubit 24(1) as observed by the second quantum computing device 18. In some examples, each of the responsive actions 52(0)-52(A) may specify a function, application, or other operation to be executed by the second quantum computing device 18 upon observation of the corresponding quantum state 50(0)-50(A).

Figure 4A:
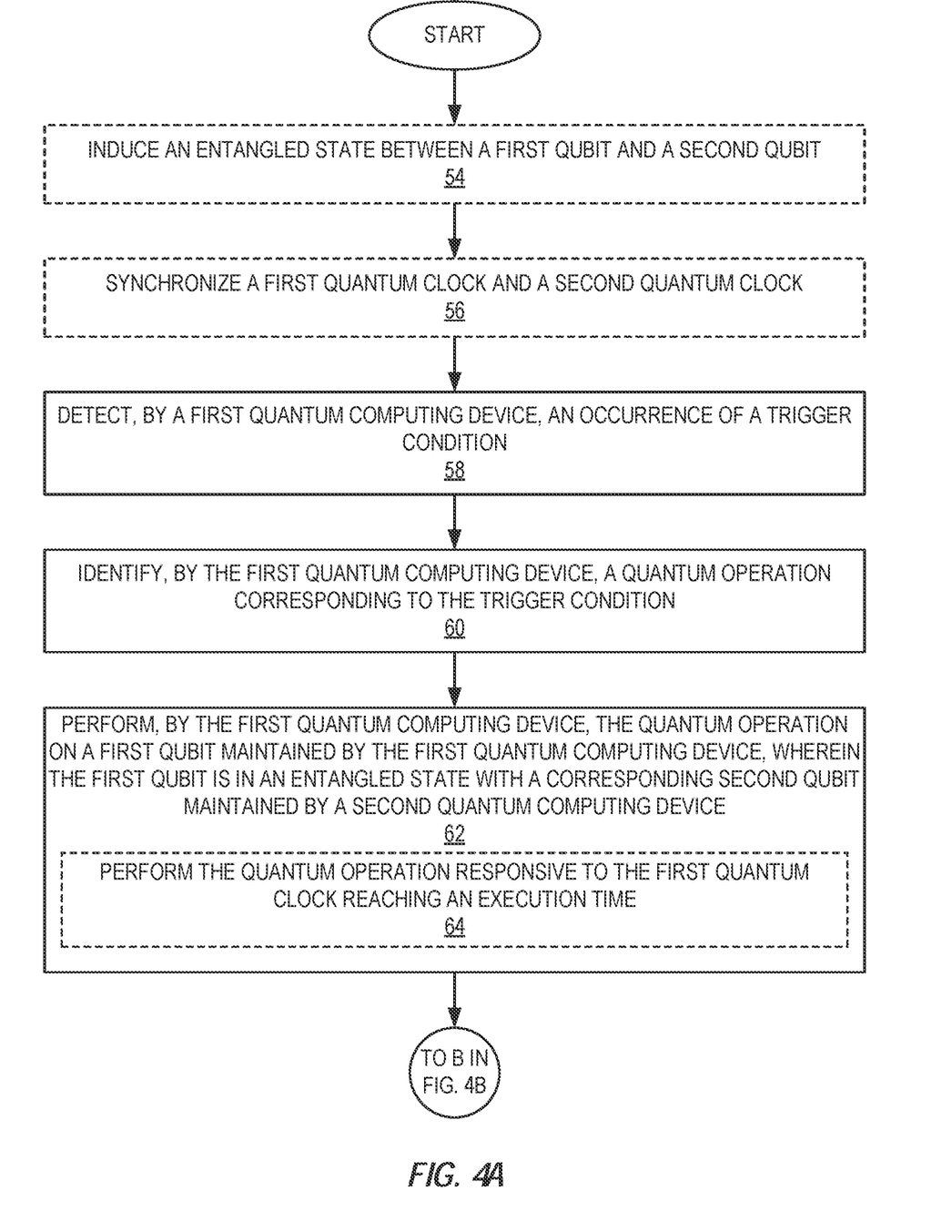
FIGS. 4A and 4B are flowcharts illustrating operations for providing rules-driven service management using entangled qubits, according to one example.
Figure 4B:
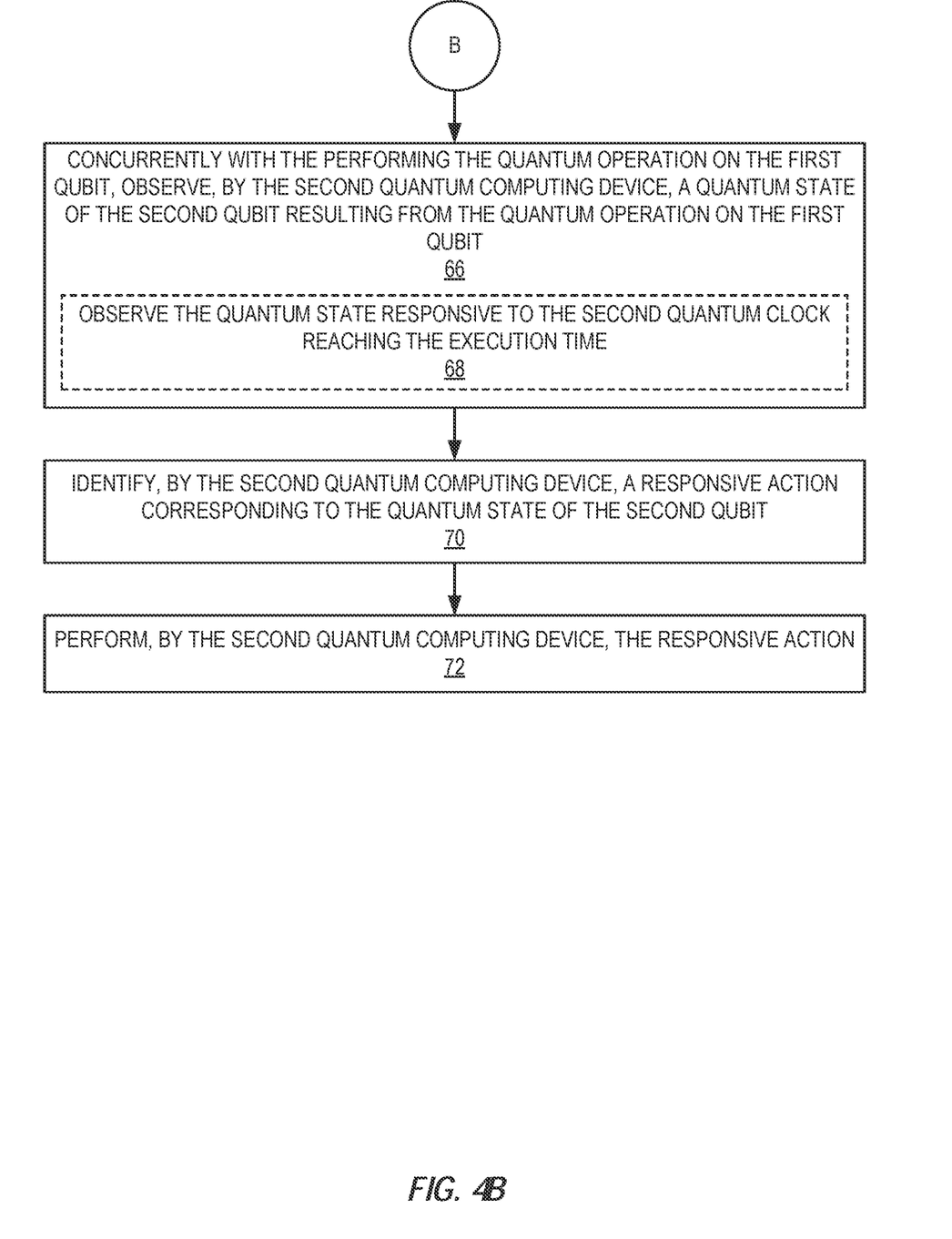

To illustrate operations for providing rules-driven service management using entangled qubits according to one example, FIGS. 4A and 4B are provided. Elements of FIGS. 1-3 are referenced in describing FIGS. 4A and 4B for the sake of clarity. Operations according to some examples begin in FIG. 4A with an entangled state being induced between a first qubit and a second qubit (e.g., the first qubit 24(0) and the second qubit 24(1) of FIG. 1) (block 54). In some examples, a first quantum clock and a second quantum clock (e.g., the first quantum clock 36 and the second quantum clock 38 of FIG. 1) may also be synchronized (block 56). Next, a first quantum computing device (e.g., the first quantum computing device 12 of FIG. 1) detects an occurrence of a trigger condition, such as the trigger condition 28 (block 58). The first quantum computing device 12 then identifies a quantum operation (e.g., quantum operation 48(0) of FIG. 2) corresponding to the trigger condition 28 (block 60). The first quantum computing device 12 performs the quantum operation 48(0) on a first qubit (e.g., the first qubit 24(0) of FIG. 1) maintained by the first quantum computing device 12, wherein the first qubit 24(0) is in an entangled state with a corresponding second qubit (e.g., the second qubit 24(1) of FIG. 1) maintained by a second quantum computing device (e.g., the second quantum computing device 18 of FIG. 1) (block 62). In some examples, the operations of block 62 for performing the quantum operation 48(0) on the first qubit 24(0) are performed responsive to the first quantum clock 36 reaching an execution time (block 64). Operations then continue at block 66 of FIG. 4B.

Referring now to FIG. 4B, the second quantum computing device 18, concurrently with the performing the quantum operation on the first qubit, observes a quantum state (e.g., the quantum state 50(0) of FIG. 3) of the second qubit 24(1) resulting from the quantum operation on the first qubit 24(0) (block 66). According to some examples, the operations of block 66 for observing the quantum state 50(0) of the second qubit 24(1) are performed responsive to the second quantum clock 38 reaching the execution time (block 68). The second quantum computing device 18 next identifies a responsive action, such as the responsive action 40 of FIG. 1, corresponding to the quantum state 50(0) of the second qubit 24(1) (block 70). The second quantum computing device 18 then performs the responsive action 40 (block 72).

Figure 5:
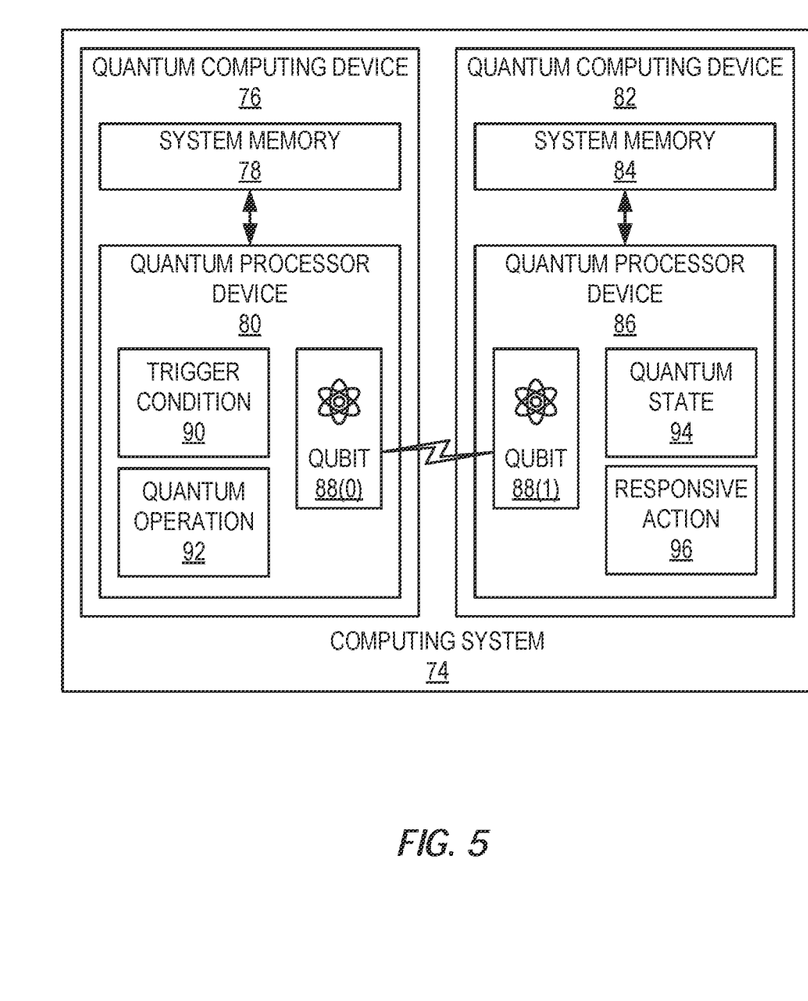
FIG. 5 is a simpler block diagram of the computing system of FIG. 1 for providing rules-driven service management using entangled qubits, according to one example.

FIG. 5 is a simpler block diagram of the computing system 74 of FIG. 1 for providing federated messaging for quantum systems using teleportation, according to one example. In FIG. 5, the computing system 74 includes a quantum computing device 76 (i.e., the "first quantum computing device 76") that comprises a first system memory 78 and a first quantum processor device 80, and also includes a quantum computing device 82 (i.e., the "second quantum computing device 82") that comprises a second system memory 84 and a second quantum processor device 86. The first quantum processor device 80 of the first quantum computing device 76 maintains a qubit 88(0) (i.e., the "first qubit 88(0)") that is in an entangled state with a qubit 88(1) (i.e., the "second qubit 88(1)") maintained by the second quantum processor device 86 of the second quantum computing device 82.

Upon detecting a trigger condition 90, the first quantum computing device 76 identifies a quantum operation 92 (e.g., measurements or other actions that may be performed on the first qubit 88(0) that will result in a given quantum state of the first qubit 88(0)) that corresponds to the trigger condition 90. After identifying the quantum operation 92 corresponding to the trigger condition 90, the first quantum computing device 76 performs the quantum operation 92 on the first qubit 88(0). Because the first qubit 88(0) is in an entangled state with the second qubit 88(0) maintained by the second quantum computing device 82, the quantum operation 92 performed on the first qubit 88(0) by the first quantum computing device 76 results in a corresponding change in the quantum state 94 of the second qubit 88(1). The second quantum computing device 82 observes the quantum state 94 of the second qubit 88(1) concurrently with the first quantum computing device 76 performing the quantum operation 92 on the first qubit 88(0). Based on the observed quantum state 94 of the second qubit 88(1), the second quantum computing device 82 identifies a responsive action 96 to perform, and then performs the responsive action 96.

Figure 6:
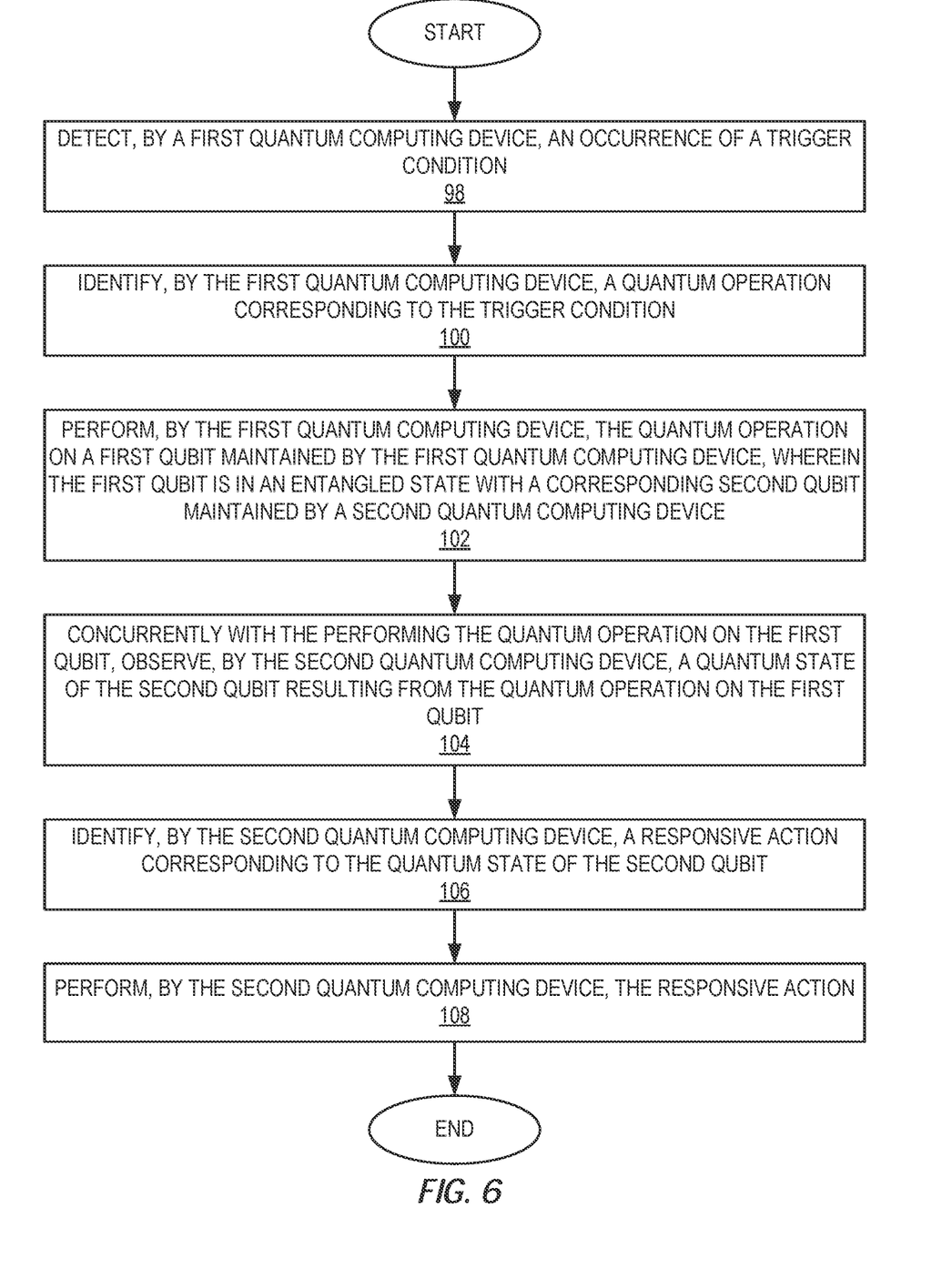
FIG. 6 is a flowchart of a simplified method for providing rules-driven service management using entangled qubits in the computing system of FIG. 5, according to one example.

FIG. 6 is a flowchart of a simplified method for rules-driven service management using entangled qubits. Elements of FIG. 5 are referenced in describing FIG. 6, for the sake of clarity. In FIG. 6, operations begin with a first quantum computing device 76 (e.g., the first quantum computing device 76 of FIG. 5) detecting an occurrence of a trigger condition, such as the trigger condition 90 (block 98). The first quantum computing device 76 identifies a quantum operation, such as the quantum operation 92, corresponding to the trigger condition 90 (block 100). The first quantum computing device 76 then performs the quantum operation 92 on a first qubit (e.g., the first qubit 88(0) of FIG. 5) maintained by the first quantum computing device 76, wherein the first qubit 88(0) is in an entangled state with a corresponding second qubit (e.g., the second qubit 88(1) of FIG. 5) maintained by a second quantum computing device, such as the second quantum computing device 82 (block 102). Concurrently with the performing the quantum operation 92 on the first qubit 88(0), the second quantum computing device 82 observes a quantum state of the second qubit 88(1), such as the quantum state 94, resulting from the quantum operation 92 on the first qubit 88(0) (block 104). The second quantum computing device 82 next identifies a responsive action, such as the responsive action 96, corresponding to the quantum state 94 of the second qubit 88(1) (block 106). The second quantum computing device 82 then performs the responsive action 96 (block 108).

Figure 7:
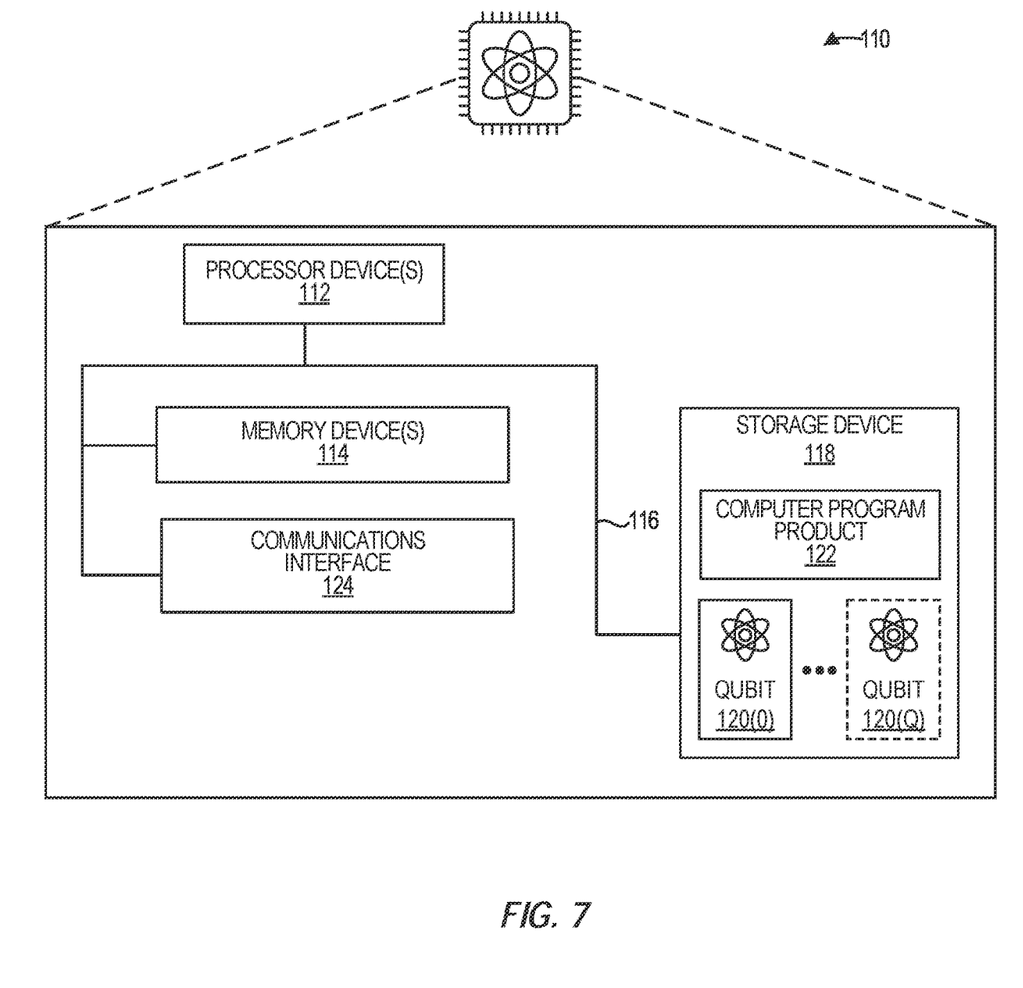
FIG. 7 is a block diagram of a quantum computing device suitable for implementing examples, according to one example.

FIG. 7 is a block diagram of a quantum computing device 110, such as the first quantum computing device 12 and the second quantum computing device 18 of FIG. 1, suitable for implementing examples according to one example. The quantum computing device 110 may comprise any computing or electronic device capable of including firmware, hardware, and/or executing software instructions to implement the functionality described herein in a quantum environment. The quantum computing device 110 includes one or more processor device(s) 112, one or more memory device(s) 114, and a system bus 116. The system bus 116 provides an interface for system components including, but not limited to, the one or more memory device(s) 114 and the one or more processor device(s) 112. The one or more processor device(s) 112 can be any commercially available or proprietary processor suitable for operating in a quantum environment. The quantum computing device 110 may further include or be coupled to a non-transitory computer-readable storage medium such as a storage device 118. The storage device 118 and other drives associated with computer-readable media and computer-usable media may provide non-volatile storage of data, data structures, computer-executable instructions, and the like. The storage device 118 may also store one or more qubits 120(0)-120(Q), which may be measured and/or manipulated by the one or more processor device(s) 112 when performing quantum computing operations.

All or a portion of the examples may be implemented as a computer program product 122 stored on a transitory or non-transitory computer-usable or computer-readable storage medium, such as the storage device 118, which includes complex programming instructions, such as complex computer-readable program code, to cause the one or more processor devices 112 to carry out the steps described herein. Thus, the computer-readable program code can comprise software instructions for implementing the functionality of the examples described herein when executed on the one or more processor devices 112.

An operator may also be able to enter one or more configuration commands through a keyboard (not illustrated), a pointing device such as a mouse (not illustrated), or a touch-sensitive surface (not illustrated). The quantum computing device 110 may also include a communications interface 124 suitable for communicating with other computing devices, including, in some implementations, classical computing devices.

The examples also facilitate an improvement to computer functionality itself by providing a federated messaging mechanism to intelligently route quantum information transmitted over a communications network among quantum computing devices, resulting in improved functionality of computing devices on the communications network. Thus, the examples are directed to specific improvements in computer functionality.

What is claimed is:

1. A method, comprising:
    detecting, by a first quantum computing device, an occurrence of a trigger condition;
    determining, by the first quantum computing device, that the trigger condition is a valid trigger condition based on a plurality of rules;
    in response to determining that the trigger condition is a valid trigger condition, identifying, by the first quantum computing device, a quantum operation corresponding to the trigger condition, wherein the trigger condition is identified in a rule from among the plurality of rules and the quantum operation is identified in the rule as being associated with the trigger condition; and
    performing, by the first quantum computing device, the quantum operation on a first qubit maintained by the first quantum computing device, wherein the first qubit is in an entangled state with a corresponding second qubit maintained by a second quantum computing device.

2. The method of claim 1, wherein the trigger condition comprises one or more of a central processing unit (CPU) threshold detection, a memory limitation occurrence, and a security key cycle request.

3. The method of claim 1, wherein the quantum operation causes a change in a quantum state of the second qubit comprising one or more of a change in a Bell state, a change in spin, a change in rotation angle, a change in degree, and a change in plane.

4. The method of claim 1, further comprising, prior to detecting the occurrence of the trigger condition, inducing the entangled state between the first qubit and the second qubit.

5. The method of claim 1, wherein identifying the quantum operation corresponding to the trigger condition comprises identifying the quantum operation using a trigger rules engine of the first quantum computing device, the trigger rules engine comprising the plurality of rules each comprising a trigger condition and a corresponding quantum operation.

6. The method of claim 1 further comprising:
    observing, by the second quantum computing device, a quantum state of the second qubit resulting from the quantum operation on the first qubit;
    identifying, by the second quantum computing device, a responsive action corresponding to the quantum state of the second qubit; and
    performing, by the second quantum computing device, the responsive action.

7. The method of claim 6, wherein identifying the responsive action corresponding to the quantum state of the second qubit comprises identifying the responsive action using an action rules engine of the second quantum computing device, the action rules engine comprising a plurality of rules each comprising a quantum state and a corresponding responsive action.

8. The method of claim 6 wherein the first quantum computing device and the second quantum computing device are in time synchronization with one another, and wherein observing, by the second quantum computing device, the quantum state of the second qubit resulting from the quantum operation on the first qubit comprises observing, by the second quantum computing device at a same time that the first quantum computing device performs the quantum operation, the quantum state of the second qubit resulting from the quantum operation on the first qubit.

9. The method of claim 1, further comprising:
    in response to performing the quantum operation on the first qubit, identifying, by the second quantum computing device, a quantum state of the second qubit resulting from the quantum operation on the first qubit; and
    performing, by the second quantum computing device, a responsive action corresponding to the quantum state of the second qubit, wherein the responsive action is identified in a second rule from among a second plurality of rules and the responsive action is identified in the second rule as being associated with the quantum state.

10. A computing system, comprising:
    a first quantum computing device, comprising:
        a first system memory; and
        a first quantum processor device coupled to the first system memory, wherein the first quantum processor device is to:
            detect an occurrence of a trigger condition;
            determine that the trigger condition is a valid trigger condition based on a plurality of rules;
            in response to determining that the trigger condition is a valid trigger condition, identify a quantum operation corresponding to the trigger condition, wherein the trigger condition is identified in a rule from among the plurality of rules and the quantum operation is identified in the rule as being associated with the trigger condition; and
            perform the quantum operation on a first qubit that is maintained by the first quantum computing device and that is in an entangled state with a corresponding second qubit maintained by a second quantum computing device.

11. The computing system of claim 10, wherein the trigger condition comprises one or more of a central processing unit (CPU) threshold detection, a memory limitation occurrence, and a security key cycle request.

12. The computing system of claim 10, wherein the quantum operation causes a change in a quantum state of the second qubit comprising one or more of a change in a Bell state, a change in spin, a change in rotation angle, a change in degree, and a change in plane.

13. The computing system of claim 10, wherein the first quantum processor device is further to identify the quantum operation corresponding to the trigger condition using a trigger rules engine comprising the plurality of rules each comprising a trigger condition and a corresponding quantum operation.

14. The computing system of claim 10, further comprising:
    the second quantum computing device, comprising:
        a second system memory; and a second quantum processor device coupled to the second system memory, wherein the second quantum processor device is to:
observe a quantum state of the second qubit resulting from the quantum operation on the first qubit;
identify a responsive action corresponding to the quantum state of the second qubit; and
perform the responsive action.

15. The computing system of claim 14, wherein the second quantum processor device is to identify the responsive action corresponding to the quantum state of the second qubit using an action rules engine comprising a plurality of rules each comprising a quantum state and a corresponding responsive action.

16. The computing system of claim 14, wherein the first quantum computing device and the second quantum computing device are in time synchronization with one another, and wherein to observe the quantum state of the second qubit resulting from the quantum operation on the first qubit, the second quantum processor device is further to observe at a same time that the first quantum computing device performs the quantum operation, the quantum state of the second qubit resulting from the quantum operation on the first qubit.

17. A non-transitory computer-readable storage medium including instructions to cause a quantum processor device of a first quantum computing device to:
detect an occurrence of a trigger condition;
determine that the trigger condition is a valid trigger condition based on a plurality of rules;
in response to determining that the trigger condition is a valid trigger condition, identify a quantum operation corresponding to the trigger condition, wherein the trigger condition is identified in a rule from among the plurality of rules and the quantum operation is identified in the rule as being associated with the trigger condition; and
perform the quantum operation on a first qubit that is maintained by the first quantum computing device and that is in an entangled state with a corresponding second qubit maintained by a second quantum computing device.

18. The non-transitory computer-readable storage medium of claim 17, wherein the trigger condition comprises one or more of a central processing unit (CPU) threshold detection, a memory limitation occurrence, and a security key cycle request.

19. The non-transitory computer-readable storage medium of claim 17, wherein the quantum operation causes a change in a quantum state of the second qubit comprising one or more of a change in a Bell state, a change in spin, a change in rotation angle, a change in degree, and a change in plane.

20. The non-transitory computer-readable storage medium of claim 17 wherein, to identify the quantum operation corresponding to the trigger condition, the instructions further cause the quantum processor device to identify the quantum operation corresponding to the trigger condition using a trigger rules engine comprising the plurality of rules each comprising a trigger condition and a corresponding quantum operation.

* * * * *